United States Patent [19]
Culley

[11] Patent Number: 5,297,899
[45] Date of Patent: Mar. 29, 1994

[54] MODULAR FLOATING ENVIRONMENTAL MOORING SYSTEM

[75] Inventor: John T. Culley, Mystic, Conn.

[73] Assignee: Sea Star Atlantic, Inc., Mystic, Conn.

[21] Appl. No.: 803,150

[22] Filed: Dec. 5, 1991

[51] Int. Cl.$^5$ .............................................. B63B 35/38
[52] U.S. Cl. .................................. 405/219; 114/266; 114/267
[58] Field of Search .................. 428/71, 76; 52/309.9, 52/309.11; 114/230, 263–267; 405/195.1, 203, 218, 219, 224

[56] References Cited

U.S. PATENT DOCUMENTS

| | | | |
|---|---|---|---|
| 2,771,617 | 11/1956 | Brackx . | |
| 3,041,639 | 7/1962 | Atlas | 114/230 X |
| 3,320,918 | 5/1967 | Zalejski | 114/230 X |
| 3,354,479 | 11/1967 | Koppenol et al. | 405/218 X |
| 3,521,588 | 7/1970 | Atlas | 114/263 |
| 3,672,178 | 6/1972 | Trautwein | 405/218 |
| 3,786,609 | 1/1974 | DiFazio | 52/309.9 X |
| 3,967,569 | 7/1976 | Shorter, Jr. | |
| 3,970,024 | 7/1976 | Fisher . | |
| 4,067,285 | 1/1978 | Jones et al. | 114/266 |
| 4,263,865 | 4/1981 | Shorter | 114/266 X |
| 4,290,381 | 9/1981 | Penman | 114/263 |
| 4,318,361 | 3/1982 | Sluys | 114/263 |
| 4,418,634 | 12/1983 | Gerbus | 114/263 |
| 4,559,891 | 12/1985 | Shorter, Jr. | 114/263 |
| 4,676,041 | 6/1987 | Ford | 52/309.11 |
| 4,709,647 | 12/1987 | Rytand | 114/267 |
| 4,795,666 | 1/1989 | Okada et al. | 52/309.9 X |
| 4,825,798 | 5/1989 | Abeille | 114/267 |
| 4,887,654 | 12/1989 | Rytand | 114/267 |
| 4,940,021 | 7/1990 | Rytand | 405/219 X |
| 4,963,408 | 10/1990 | Huegli | 428/71 |
| 4,980,214 | 12/1990 | Charriere | 428/71 X |

FOREIGN PATENT DOCUMENTS

| | | | |
|---|---|---|---|
| 245816 | 11/1987 | European Pat. Off. | 428/71 |
| 65489 | 3/1991 | Japan | 114/263 |

Primary Examiner—Randolph A. Reese
Assistant Examiner—John Ricci
Attorney, Agent, or Firm—Albert W. Hilburger

[57] ABSTRACT

A modular environmental mooring system generally of star shaped configuration accommodates a plurality of boats at circumferentially spaced, radially extending positions with respect to a central dock member. The central dock member is of generally annular configuration which includes a plurality of segments, each having a planar outwardly facing endwall and a pair of planar sidewalls lying in spaced apart angularly disposed planes. The segments are arranged with their sidewalls in a contiguous relationship. The boats float alongside a plurality of elongated finger dock members which extend radially outwardly from associated endwalls of the segments. Each segment and each finger dock member includes a plastic foam core member having planar structural sheet members which coterminously underlie and overlie the plastic foam core and are bonded to the plastic foam core. An elastomeric outer coating encapsulates the plastic foam core member and the structural sheet members which results in maximized strength and structural and environmental integrity with minimum weight.

19 Claims, 8 Drawing Sheets

MODULAR FLOATING ENVIRONMENTAL MOORING SYSTEM

BACKGROUND OF THE INVENTION

I. Field of the Invention

The present invention relates generally to a modular floating environmental mooring system and, more particularly, to a environmental mooring system which is generally of star shaped configuration so as to simultaneously accommodate a large number of boats. The environmental mooring system is comprised of a plurality of individual components which are of a particularly light weight, strong, and durable construction.

II. Description of the Prior Art

In recent years, there has been a dramatic increase in water sports activity and a substantial demand for recreational boats and boating apparatus. This increase in demand has necessitated a corresponding increase in boat moorings and boat marinas along the coastland and inland waterways. Floating wharf or docking structures have gained a wide acceptance in modern marinas and boat harbors as a most practical means of docking and mooring small craft in tidal waters or in other waters where the water level changes. The use of a floating docking structure permits the level of the docking structure and hence the walkway to maintain itself at a relatively constant height with respect to the craft docked or moored. This relatively constant positioning simplifies the tying or mooring operation and naturally maximizes the convenience in boarding.

The use of multiple individual float units or pontoons allows a versatility in the modular arrangement of the overall wharf structure. For example, a central walkway constructed with a series of projecting side fingers forming boat slips is a common arrangement of float units in wharf structures.

Ocean marinas are typically formed with a plurality of interconnected floats or pontoons which span between a series of stationary vertical pilings located a short distance off the shore. These pilings, which rise to a height substantially above the water line, cooperate with cut-outs or enlarged apertures formed in the floats, whereby the floats may rise and fall along the length of the pilings in response to the tidal movement, yet be positively maintained in their lateral orientation with respect to the shoreline. U.S. Pat. No. 3,967,569 to Shorter, Jr. is descriptive of such a construction.

A number of years ago, it came to be recognized that the shrinking shoreline available for wharves and docks would necessitate offshore docking and platforms and the like. A number of constructions were envisioned as a result. For example, U.S. Pat. No. 3,041,639 to Atlas discloses a multiple boat mooring including a central buoy from which radially extend a plurality of circumferentially spaced tubular members rigidly joined together by tie bars and from which depend rectangular, perforated, aprons of a material which provide buoyancy to the structure and separation of the boats being accommodated.

U.S. Pat. No. 3,320,918 to Zalejski discloses a plurality of very large floating parking structures for automotive vehicles to supplement land parking space. Each structure is of a heavy construction and is self-powered. A plurality of the structures may be joined and arranged in the form of fingers extending radially at a plurality of circumferentially spaced positions.

Another approach to the problem is provided in U.S. Pat. No. 3,672,178 to Trautwein which discloses a rotary dock including a central hub and a plurality of integral radially extending, circumferentially spaced, fingers which define boat slips between adjacent fingers. The rotary dock is rotated in the plane of the water so that any given one of the plurality of boat slips may be positioned at any desired azimuthal location.

A floating boat anchorage of modular construction which broadly includes features of the preceding patents is disclosed in U.S. Pat. No. 3,521,588 to Atlas which includes radially extending finger members for a plurality of boats. Each module comprises a frame of light metal construction enclosed, except on the bottom, within a shell of plastic material such as polyester.

For the most part, the constructions just described have been lacking to one degree or another in structural strength and/or durability, that is, a resistance to the effects of the aqueous environment, especially sea water, in which they are used and to which they are exposed. Over the years, various attempts have been made to address this problem and, seemingly simultaneously, modular floating structures of a variety of shapes and designs have also been devised. One instance of such a modular floating structure is U.S. Pat. 4,067,285 to Jones, et al which provides for a plurality of triangular modules constructed of ferrocement. Each module has conduits extending through its walls. Tension members are threaded through the conduits and placed under tension to hold the modules together in a rigid assembly. Fasteners may also be used in securing the walls together in a rigid assembly together with complimentary alignment means to assure that the modulars are held in a predetermined relationship.

More recently, U.S. Pat. Nos. 4,709,647; 4,887,654; and 4,940,021, all to Rytand, have been devised. These provide a plurality of float modules with opposed sidewalls and a bottom wall defining an interior space open at the top and filled with foam material such as polystyrene. A wooden deck structure is positioned on top of each float module for the walkway of the floating dock.

Other modular designs are disclosed in U.S. Pat. Nos. 3,967,569 to Shorter, Jr., and 4,318,361 to Sluys both of which disclose a lightweight concrete float which includes a concrete shell surrounding either a hollow or a buoyant foam core. In each instance, a deck, also of concrete, overlies the shell.

Still another design is provided in U.S. Pat. No. 4,559,891 to Shorter, Jr. which discloses a pontoon structure including opposed sidewalls and a bottom wall defining an interior space open at the top and injected with foam material such as polystyrene. A cap of moldable material such as concrete overlies the pontoon structure.

A particularly interesting design is presented in U.S. Pat. No. 3,970,024 to Fisher which discloses a modular floating assemblage including polymer foam blocks with impervious shells composed of fiberglass and resin. Each block has a continuous channel about its periphery. When a plurality of such blocks is positioned contiguously to form a floating assemblage, its integrity is assured by means of floatable bars fitted closely to the facing channels after which a tension band is applied to encircle the structure in the outer aligned channels formed by the modules. In this manner, a broad pattern of individual floats can be assembled in side-by-side and end-to-end relationship to form a floating platform having a substantial area.

It was in light of, and in a concerted attempt to improve upon, the prior art as just described that the present invention was conceived and has now been reduced to practice.

SUMMARY OF THE INVENTION

The present invention, then, relates generally to a modular environmental mooring system of star shaped configuration to accommodate a plurality of boats at circumferentially spaced, radially extending positions with respect to a central dock member. The central dock member is of generally annular configuration which includes a plurality of segments, each having a planar outwardly facing endwall and a pair of planar sidewalls lying in spaced apart angularly disposed planes. The segments are arranged with their sidewalls in a contiguous relationship. The boats float alongside a plurality of elongated finger dock members which extend radially outwardly from associated endwalls of the segments. Each segment and each finger dock member includes a plastic foam core member having planar structural sheet members which coterminously underlie and overlie the plastic foam core and are bonded to the plastic foam core. An elastomeric outer coating encapsulates the plastic foam core member and the structural sheet members which results in maximized strength and structural and environmental integrity with minimum weight.

Although not described in the present disclosure with any specific detail, it is envisioned that the modular environmental mooring system of the invention would provide the platform for those products and services which are customarily provided at conventional land connected marinas. It is envisioned that the environmental mooring system of the invention, therefore, would have a self-contained electrical system, which, for example, would utilize solar panels mounted to the deck surface with appropriate storage cells for non-daylight performance. In another instance, the environmental mooring system could employ an engine powered generator mounted in its hub section. The available power would be used for navigational and safety lighting as well as for the operation of pumps, and the like. Additionally, a self-contained waste management system would provide for a pumping out of individual boat waste-holding tanks into a central tank located in the hub section of the system. The environmental mooring system would include a pump for this purpose as well as associated plumbing and the holding tank.

A significant draw back of all known mooring systems is that significant structural parts remain exposed to the environment which thereby effectively reduces their service life. In contrast, the present invention utilizes a reinforced foam plastic composite structure as the core of the system. This core provides the flotation as well as strength to a substantial extent. This reinforced core is then totally encapsulated in a layer of solid polyurethane elastomeric plastic having a thickness generally in the range of 0.10 inches to 0.20 inches. This encapsulation provides additional structural strength and serves as the actual deck surface along with its role as a protective covering.

In this regard, it is noteworthy that the elongated finger dock members which extend radially outwardly from the central dock member are all provided with non-elastomeric planar structural sheet members which coterminously overlie and underlie, respectively, the plastic foam core member. These are bonded to the core member to form a rigid construction. Thereafter, the elastomeric outer coating is applied so as to encapsulate the plastic foam core member and the structural sheet members. This construction results in maximized structural and environmental integrity at a minimum of weight. In actual fact, the only components which react to bending forces caused by weight placed upon the upper surface of the finger dock members are the plastic foam core member itself and whatever counter active strength is present in the elastomeric outer coating.

The present invention comprises a plurality of modular components of manageable size which can be joined together to form a completed system.

It must be recognized that the components of the system must be transportable from a manufacturing facility to the site at which they will be joined and placed in operation. Accordingly, they must be of a size compatible with standard common carriers, whether that be trucks, trains, or aircraft. For ease of handling, it is preferred that they be light in weight, yet must have the requisite strength to withstand wave action, movable loading on their surfaces, including people, and to result in a secure structure for boats tied up to it.

The modular components of the invention can be easily assembled and launched. In a preferred procedure, the individual modular components would be placed in the water, taken to the general location on a surface of the water which is the preferred location for the completed environmental mooring system, then assembled, one component at a time.

Long life for the environmental mooring system is assured by reason of the encapsulation of all of the structural components with the exception of necessary fittings for attaching modular components together, which are preferably of stainless steel. Additionally, the elastomeric outer coating has shock absorbtive qualities by reason of which indentations caused by boats striking it will, over time, flatten out and the surface of the coating will return to its original shape. At the same time, the elastomeric outer coating will result in minimal damage to any boat which strikes it.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention and, together with a description, serve to explain the principles of the invention in general terms. Like numerals refer to like parts throughout the disclosure.

DETAILED DESCRIPTION OF THE PREFERRED EMBODIMENT

Figure 1:
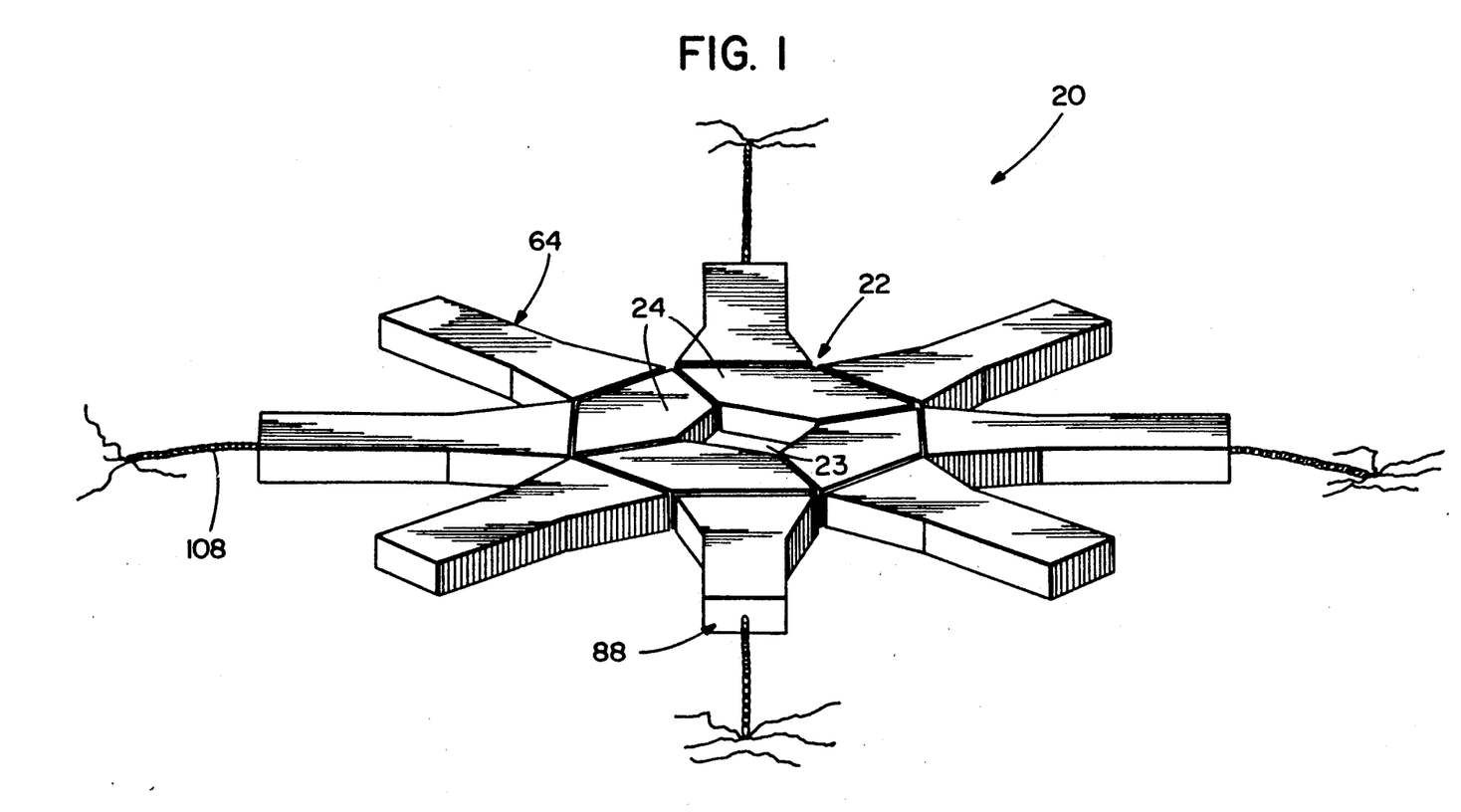
FIG. 1 is a perspective view of a modular floating environmental mooring system embodying the principles of the present invention.
Figure 2:
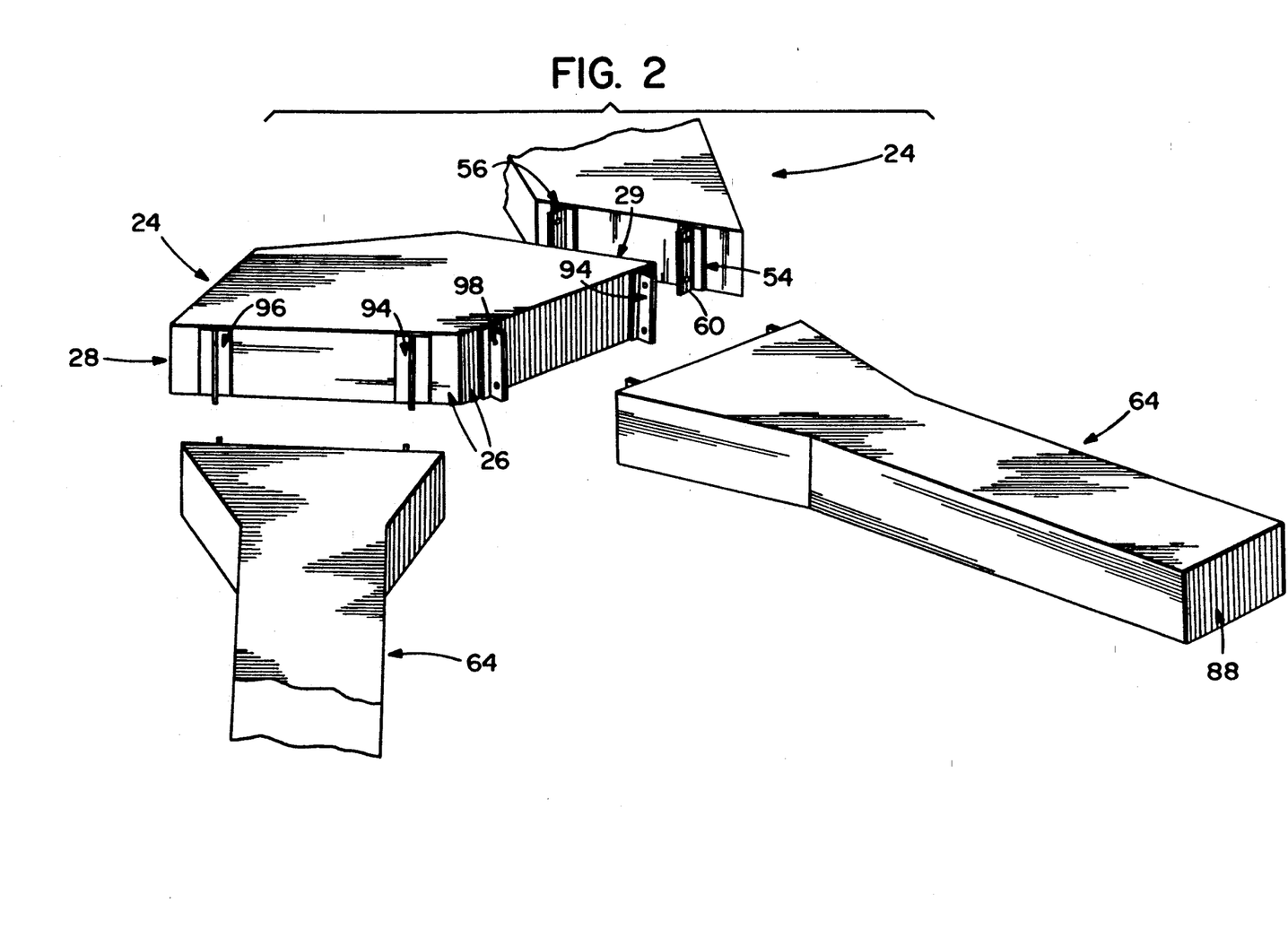
FIG. 2 is an exploded perspective view of a portion of the system illustrated in FIG. 1.
Figures 3, 3A:
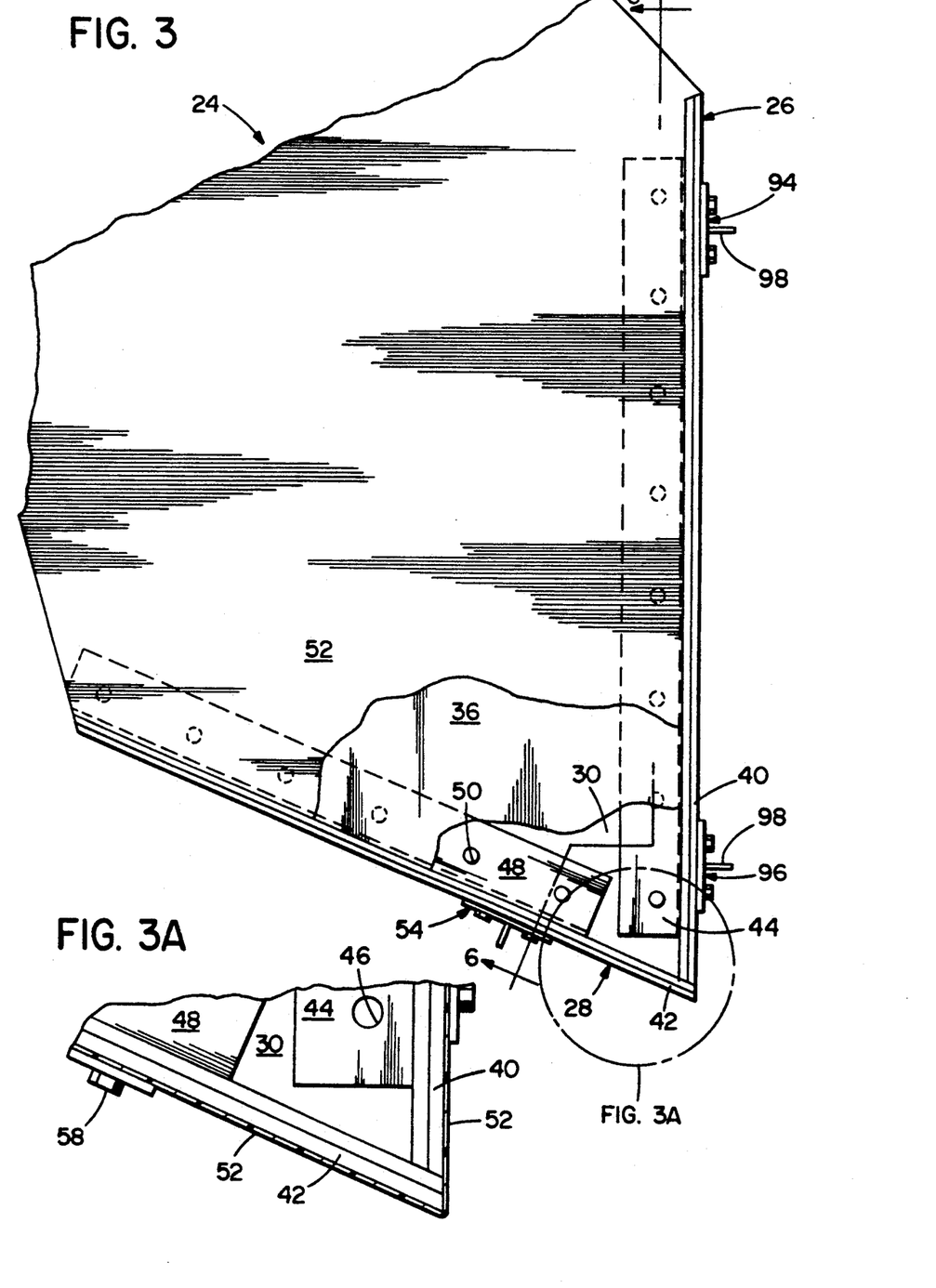
FIG. 3 is a top plan view of a part of one of the components of the system of the invention.
FIG. 3A is a detail enlarged top plan view of a portion of the structure illustrated in FIG. 3.
Figure 4:
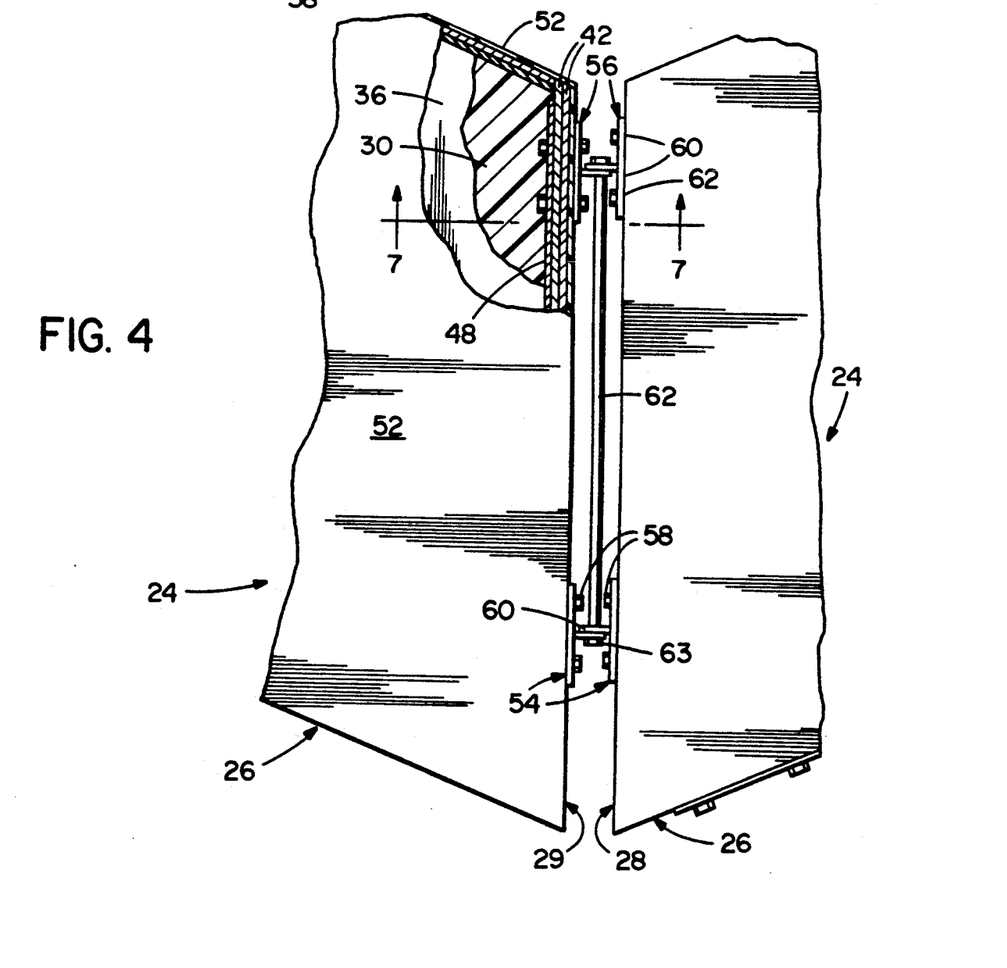
FIG. 4 is a detail top plan view, certain parts being cut away and shown in section for clarity, illustrating the connection between two of the components of the present invention.
Figure 5:
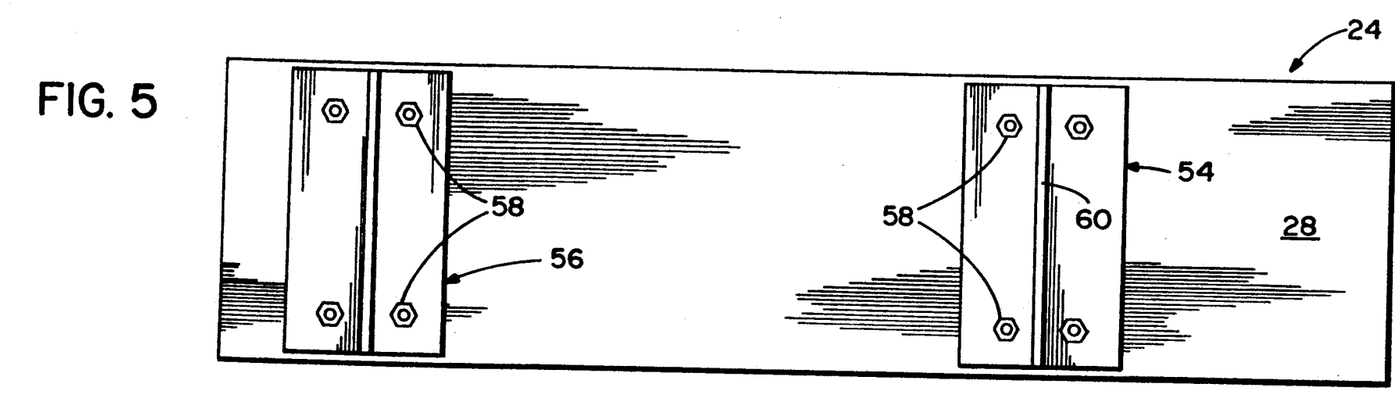
FIG. 5 is a side elevational view of one of the components of the present invention.
Figure 6:
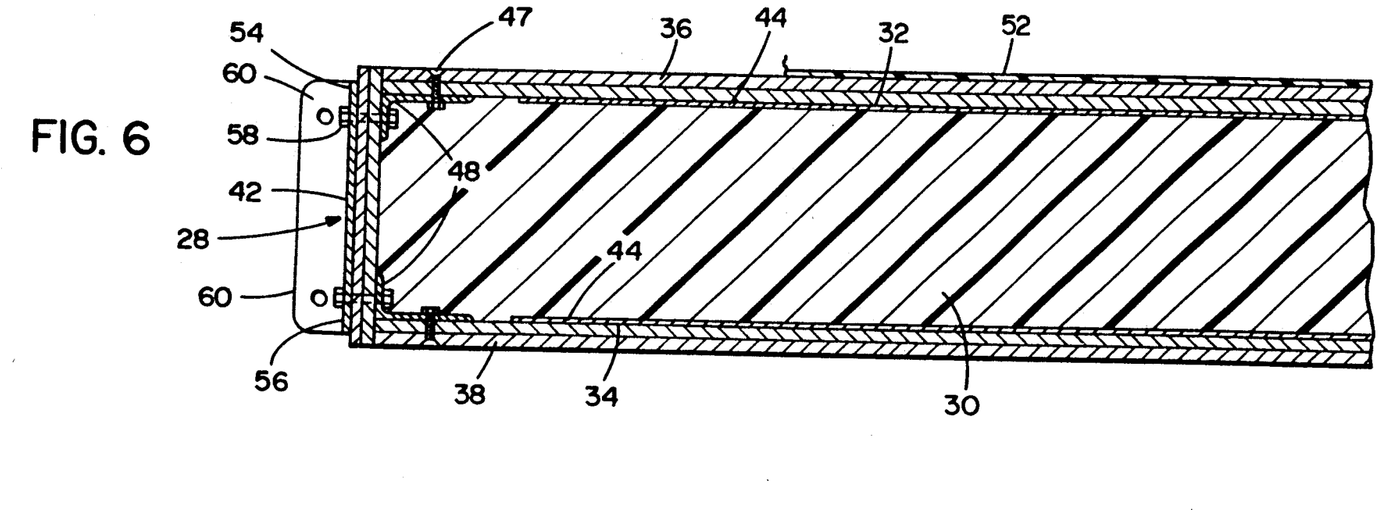
FIG. 6 is a cross section view taken generally along line 6—6 in FIG. 3.
Figure 7:
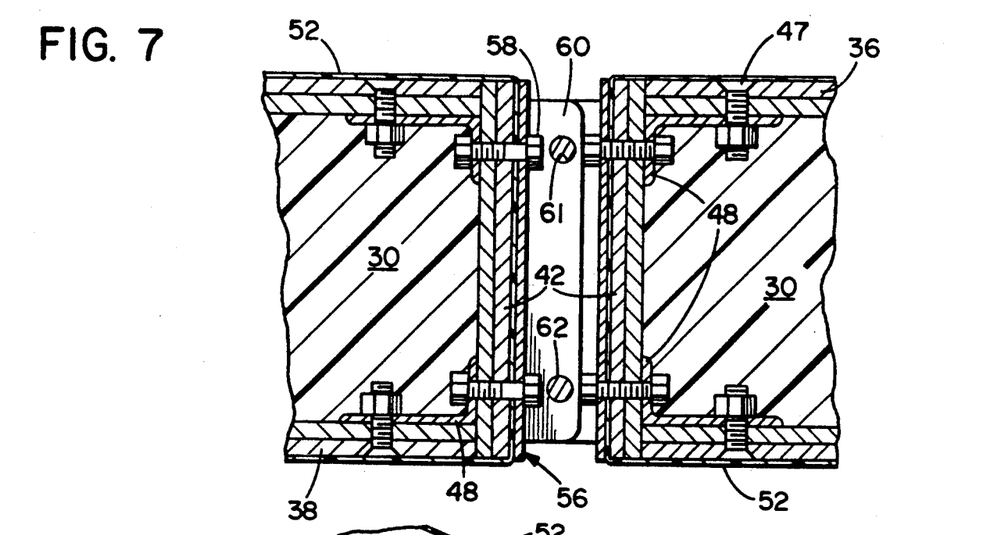
FIG. 7 is a detail cross section view taken generally along lines 7—7 in FIG. 4.

Turn now to the drawings and, initially, to FIG. 1 which illustrates a modular floating environmental mooring system 20 which embodies the present invention. The system 20 comprises a central dock member 22 of generally annular configuration having an octagonal outer periphery and a squared inner periphery which defines an opening 23 for unrestricted access to the water. As seen particularly well in FIG. 2, each segment 24 includes a pair of mutually angularly disposed planar outwardly facing endwalls 26 and a pair of planar sidewalls 28, 29 lying, respectively, in spaced apart angularly disposed planes. As seen in FIG. 1, the segments 24 are arranged in a contiguous side-by-side relationship such that four of the segments are combined to form the central dock member 22.

Turn now to FIGS. 2-7 for a more detailed description of the each of the segments 24. Each segment 24 includes a plastic foam core member 30 of substantially uniform thickness with substantially flat upper and lower surfaces 32, 34, respectively. A planar structural sheet member 36 overlies the plastic foam core member 30 and is coterminous with the plastic foam core member. The sheet member 36 may be of wood or metal or other suitable material and is firmly bonded to the foam core member 30 by means of suitable adhesive. In a similar fashion, a planar structural sheet member 38 is coterminous with the lower surface 34 of the foam core member 30 and is also bonded thereto by means of suitable adhesive. In a typical construction, the plastic foam core member 30 may have a thickness of eighteen inches and the sheet members 36, 38, may actually be two thicknesses, one inch thick each, of high grade plywood. In a construction utilizing two layers of plywood, for example, the layers would also be suitably bonded to one another.

The endwalls 26 and sidewalls 28, 29 of the segments 24 are of a similar construction to that just described. Specifically, viewing especially FIG. 3, each end wall 26 of a segment 24 includes a planar structural sheet member 40 which coterminously overlies the plastic foam core member 30 and is firmly bonded to the foam core member. In similar fashion, each of the sidewalls 28, 29 includes a planar structural sheet member coterminously overlying the plastic foam core member and firmly bonded to the foam core member. The sheet members 40, 42 may be of a composition similar to that of the sheet members 36, 38 and, in the instance that they are comprised of two layers of high grade plywood, they would, in similar fashion, be bonded together by a suitable adhesive.

As best seen in FIGS. 3, 3A, 6, and 7, angle plates 44 suitably apertured as at 46 (FIG. 3A) to receive suitable fasteners 47 (FIG. 7) are employed to rigidly join the sheet members 40 at the endwalls 26 to the upper and lower sheet members 36, 38, respectively. In a similar manner, angle plates 48 apertured as at 50 (FIG. 3) to receive suitable fasteners 47 are employed to rigidly join the sheet members 42 at the sidewalls 28, 29 to the upper and lower sheet members 38, 40.

Figure 13:
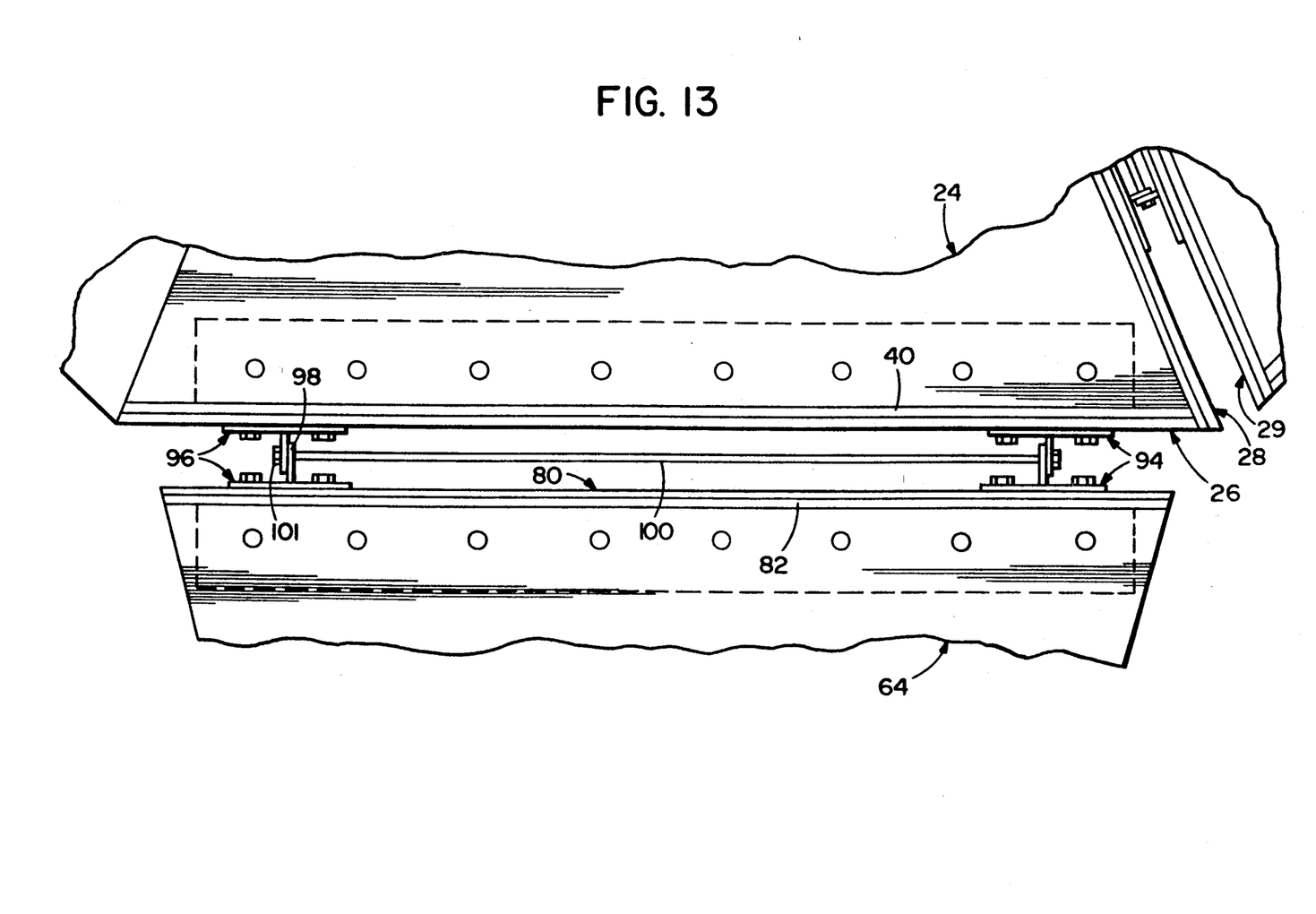
FIG. 13 is a detail top plan view illustrating another connection between components of the invention.

Thereupon, an elastomeric outer coating 52 of substantially uniform thickness is suitably applied to the exterior of the segment 24 to the extent that it has just been described. Note that the coating is not illustrated in FIGS. 3, 8, and 13 because of its relative thinness, but should be understood to be present. A particularly suitable composition for this purpose has been found to be 100% solids elastomeric urethane. Typical physical properties of such a substance to be utilized for purposes of the invention are presented in Table 1 below:

TABLE 1

| Physical Property | Preferred Value | Acceptable Range |
|---|---|---|
| Hardness, Shore D (ASTM 2240) | 60 | 50-70 |
| Tensile Strength, psi (ASTM D-412) | 3000 | 2500-4000 |
| Elongation, % (ASTM D-412) | 300 | 250-350 |
| Tear Die C, pli (ASTM D-624) | 500 | 350-600 |
| Permeance, perms (ASTM E-96) | 2.4 | 2.0-3.0 |

| | MEASURED VALUE |
|---|---|
| Taber Abrasion, mg loss | |
| CS-17 Wheel | 0 |
| H-10 Wheel | 28 |
| H-18 | 136 |
| Specific Gravity | 0.9 |
| Service Temp. Range, °F. | |
| Wet | Max. 150 |
| Dry | −80 to 200 |

Although the elastomeric outer coating 52 could be applied to the underlying structure in a variety of ways, a preferred method is to spray it on until a substantially uniform thickness in the range of 0.10 to 0.20 inches has been achieved. The elastomeric outer coating 52 provides an impervious skin on the underlying structure which serves to provide protection against the environment for an indefinite period of time. While the coating is tough, it is sufficiently resilient and with sufficient "memory" that, when deformed and subsequently released, returns to its original shape. Also, the thickness of the coating is sufficient that it adds substantially to the strength of the segment, particularly when the segment is subjected to bending stresses. Also, the thickness of the coating is adequate to guard against penetration resulting from all but the most severe forms of impact or abrasion caused by very sharp structures or instruments.

The construction enabling the interconnection of adjacent segments 24 will now be described with particular attention to FIGS. 2-6. Laterally spaced and vertically disposed connection plates 54, 56 are mounted to the endwalls 28, 29 by means of suitable fasteners 58. The connection plates 54, 56 are attached to the segments 24 such that they overlie the elastomeric outer coating 52. Because they are exposed to the environment, it is preferred that the connection plates 54, 56 be of stainless steel or other corrosion resistant material to assure their long life and may also be protected individually by the coating material 52. The fasteners 58 should also be of stainless steel construction.

Integral with, perpendicular to, and projecting outwardly from each of the connection plates 54, 56 is a pin plate 60 with a pair of vertically spaced apertures 61 therethrough. When a pair of segments are drawn together as seen particularly well in FIGS. 4 and 7, such that the sidewalls 28, 29 are disposed in a parallel relationship and closely spaced from one another, they are moved until the pin plates 60 on one segment are in an intimate relationship with those of the other segment. With their apertures aligned, elongated connection rods 62 with associated suitable lock fasteners 63 are applied and tightened to substantially permanently connect the segments 24 together. As with the other exposed hardware items used in connection with the floating environmental mooring system 20 it is highly preferred that the connection rods 62 and the fasteners 63 be of stainless steel or other corrosion resistant material.

As seen in FIG. 1, a plurality of elongated finger dock members 64 extend radially outwardly from the segments 24 of the central dock member 22. More specifically, a pair of the finger dock members 64 extend outwardly from each of the segments 24 and each of the finger dock members extending outwardly from a segment is angularly disposed with respect to the other of the finger dock members extending outwardly from the same segment. Viewing especially FIGS. 8–12, each of the finger dock members 64 is constructed of an elongated plastic foam core member 66 of substantially uniform thickness with substantially flat upper and lower surfaces 68, 70, respectively.

Figure 8:
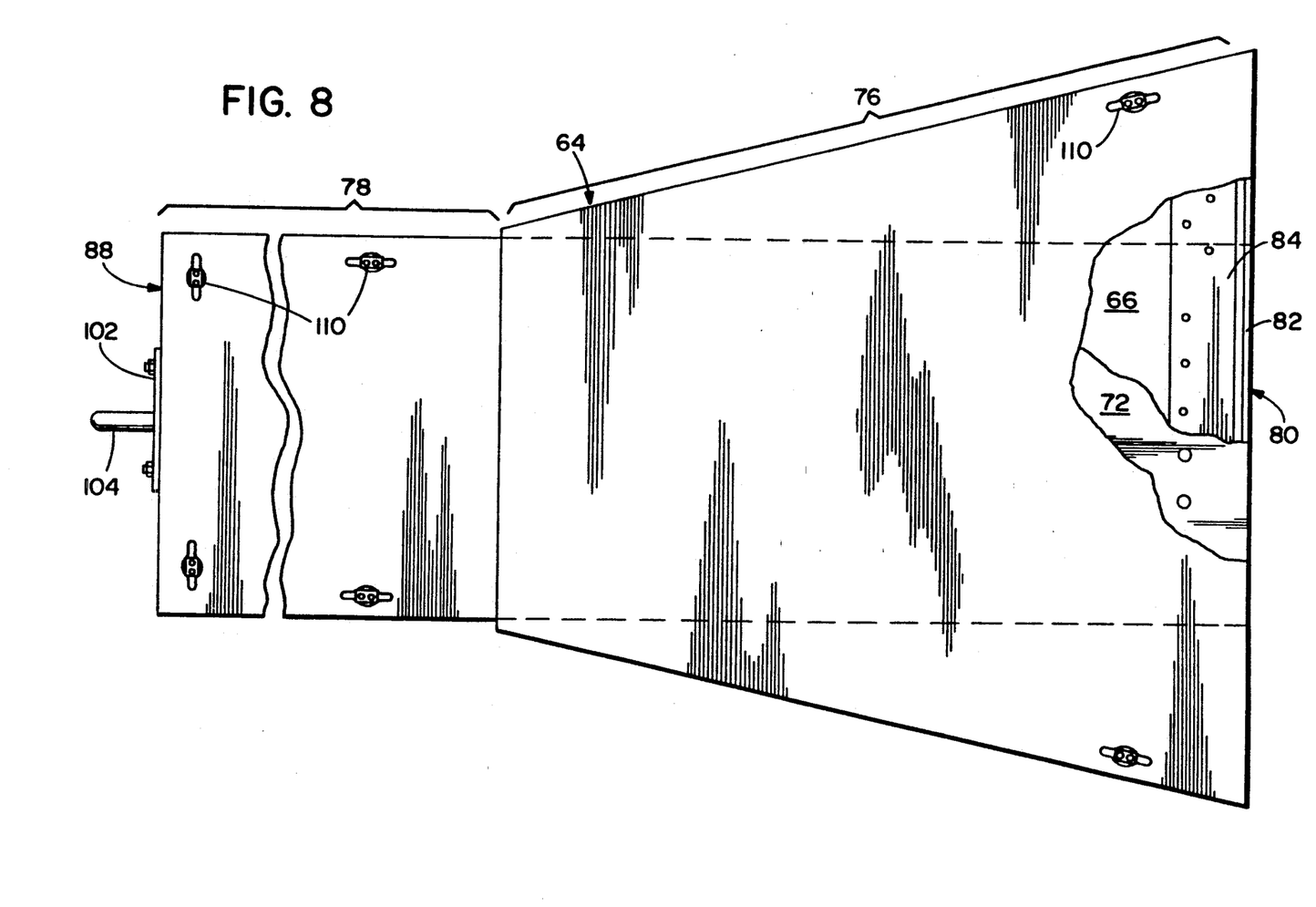
FIG. 8 is a top plan view of another component of the invention, certain parts being cut away and shown in section, for clarity.
Figure 9:
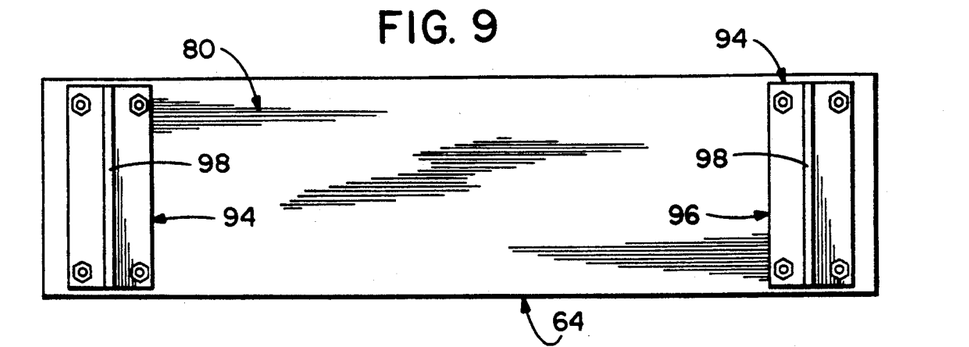
FIG. 9 is an end elevation view depicting one end of the component illustrated in FIG. 8.

Similar to the construction of the segments 24, a planar structural sheet member 72 coterminously overlies the plastic foam core member 66 and is suitably bonded to the core member. Again, the sheet member 72 may be of wood, metal, or other suitable material. Indeed, in a preferred construction, the sheet member 72 is actually comprised of a pair of layers of high quality plywood suitably bonded together as well as to the core member 66. A sheet member 74 is similarly provided on the lower surface 70 of the core member 66.

A proximal region 76 (FIG. 8) of each finger dock member 64 is generally of trapezoidal plan form while a distal region 78 is generally of rectangular plan form. This construction enables the reception of a pair of boats into the area between two adjoining finger dock members, one of the boats capable of being tied up at one of the finger dock members and another of the boats being capable of being tied up at its adjoining finger dock member. In turn, the shape of the proximal region 76 assures a maximum interface and, therefore, strongest possible connection between each finger dock member and the associated endwall 26 of its associated segment 24.

At its proximal end 80, each of the finger dock members 64 is provided with a structural sheet member 82 which coterminously overlies the plastic foam core member 66 and lies generally in a plane which is substantially perpendicular to the planes of the sheet members 72, 74. In a manner similar to that explained with respect to the segments 24, each structural sheet member 82 may be of wood or metal or other suitable material and is firmly bonded to the foam core member 66 by means of suitable adhesive. In a typical construction, the plastic foam core member 66 may have a thickness of eighteen inches as in the instance of the plastic foam core member 30 and the sheet members 82 may actually be two thicknesses, one inch thick each, of high grade plywood. In a construction utilizing two layers of plywood, for example, the layers would also be suitably bonded to one another. Suitably apertured angle plates 84 serve to fixedly join, by means of suitable fasteners 86, the proximal sheet member 82 to the upper and lower sheet members 72, 74, respectively.

Figure 10:
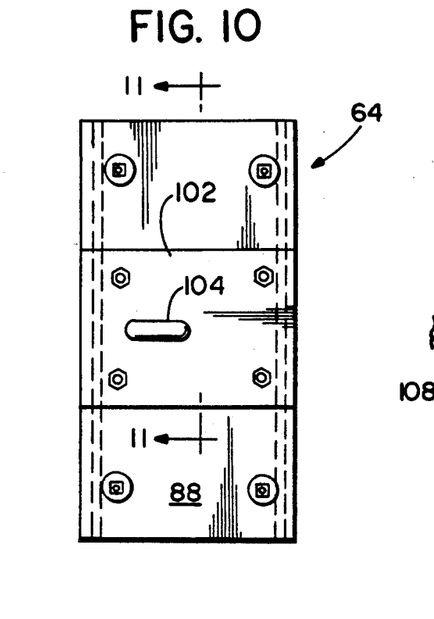
FIG. 10 is a end elevation view depicting the opposite end of the component illustrated in FIG. 8.
Figure 11:
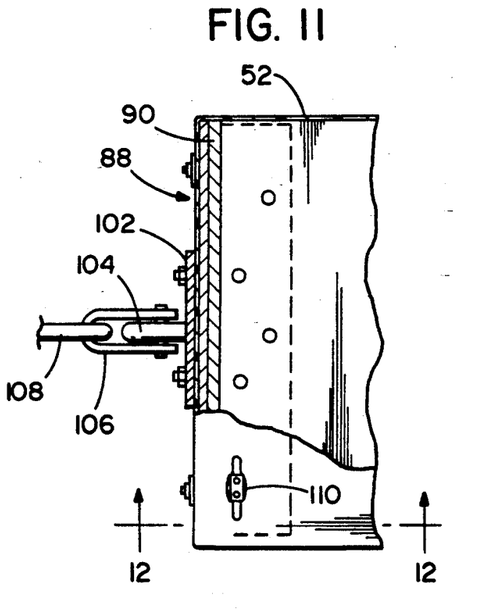
FIG. 11 is a detail cross section view taken generally along lines 11—11 in FIG. 8.
Figure 12:
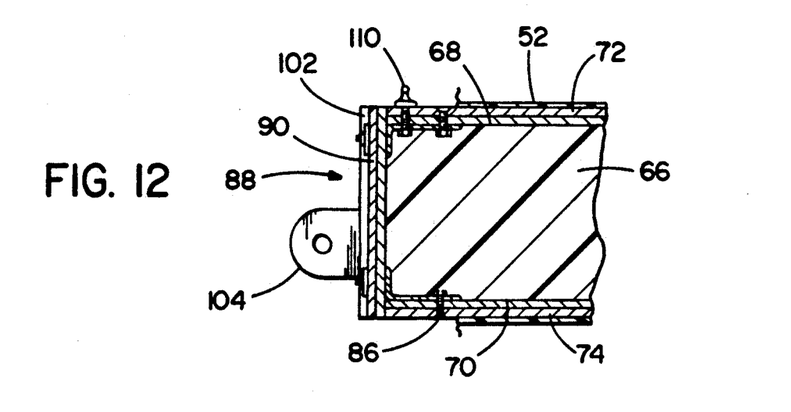
FIG. 12 is a detail cross section view taken generally along line 12—12 in FIG. 11.

A similar construction is provided at a distal end 88 of each finger dock member 64. As seen in FIGS. 10, 11, and 12, a distal sheet member 90 is depicted which is similar in form, mounting, and construction to that of the proximal sheet member 82

An elastomeric outer coating 92, similar to that of the elastomeric outer coating 52, is then provided to encapsulate the entire exterior of each finger dock member 64 to the extent that it has just been described. As in the instance of the segments 24, such encapsulation assures environmental integrity of the finger dock members as well as improved strength, particularly in a vertical plane. It is noteworthy that the construction of the finger dock members 64 is different from that of the segments 24 to the extent that there is an absence of any structural sheet members or cable members or other normal bracing expedients lying in the vertical plane and extending longitudinally of the dock members. By reason of this construction, reliance is placed upon the ability of the foam core member 66 and of the elastomeric outer coating to provide the required strength. The result is a construction which has superior strength, minimal weight, and absolute environmental integrity.

In order to join each finger dock member 64 to its associated segment 24, the endwalls 26 already mentioned with respect to the segments 24 and the ends 80 of each finger dock member 64 must be modified in the general manner previously described with respect to the sidewalls 28, 29. Specifically, laterally spaced and vertically disposed connection plates 94, 96 are suitably mounted, respectively, to the endwalls 26 of the segments 24 and to the proximal ends 80 of the finger dock members 64 (see FIGS. 3, 9, and 13). As in the instance of the connection plates 54, 56, the plates 94, 96 are fabricated of stainless steel since they lie outside of the protective elastomeric coating and may be individually protected by way of an outer coating 52. The connection plates 94, 96 are all provided with outwardly projecting pin plates 98 which are disposed in a plane perpendicular to that of its associated base plate and have a pair of vertically spaced apertures therethrough. In the manner of the pin plates 60, the pin plates 98 are adapted to receive therethrough a pair of connection rods 100. Specifically, when the proximal end 80 of a finger dock member 64 is drawn adjacent to the endwall 26 of an associated segment 24 (FIG. 13), the pin plates 98 on the connection plates associated with the finger dock member and the pin plates associated with the segment are drawn in side-by-side relationship so that their apertures are aligned whereupon the connection rods 100 are inserted and secured by means of suitable locking fasteners 101.

To maintain the positioning of the environmental mooring system 20, it is necessary to properly anchor it. For this purpose, viewing FIGS. 10, 11, and 12, a chain plate 102 is fixed to the distal sheet member 90 by means of suitable fasteners. A pad eye 104 integral with the chain plate 102 extends outwardly from the distal end. The chain plate and pad eye are of stainless steel or other strong corrosion resisting material. An end shackle 106 for an anchor chain 108 extends in customary fashion to an anchor (not shown). Such a construction is provided, preferably, at the ends of at least four of the oppositely disposed finger dock members 64 as seen in FIG. 1. In this manner, the modular environmental mooring system 20 is restrained to a substantial extent, at least against substantial movement in the major azimuthal directions. Of course, it may be desirable to provide similar constructions at the distal ends 88 of all of the finger dock members 64 such that as many as eight restraints may be provided, that is, one for each of the finger dock members.

For purposes of releasably tying watercraft to the floating environmental mooring system, a plurality of cleats 110 are suitably fastened to the upper surface of the finger dock members at spaced locations. Both the cleats and their fasteners are preferably fashioned from stainless steel or other corrosion resistant material to ensure their long life.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A modular environmental mooring system for flotation on a body of water comprising:
   a central dock member of generally annular configuration including a plurality of segments, each having at least one planar outwardly facing endwall and a pair of planar sidewalls lying in spaced apart angularly disposed planes, said segments being arranged in a contiguous side-by-side relationship;
   first connection means joining each adjacent pair of said segments at said mutually facing sidewalls;
   a plurality of elongated finger dock members, each having proximal and distal ends and extending radially outwardly from said proximal end disposed at said end wall of an associated one of said segments to said distal end; and
   second connection means joining said proximal end of each of said finger dock members to said endwall of its associated one of said segments;
   wherein each of said segments has a generally flattened inner surface spaced from said planar end wall, said inner surfaces of all of said segments comprising said central dock member together defining a generally squared opening for unrestricted access to the water.

2. A modular floating docking system as set forth in claim 1
   wherein each of said segments includes:
   a plastic foam core member of substantially uniform thickness with substantially flat upper and lower surfaces;
   an upper planar structural sheet member coterminously overlying said plastic foam core member and bonded thereto; and
   a lower planar structural sheet member coterminously underlying said plastic foam core member and bonded thereto; and
   an elastomeric outer coating of substantially uniform thickness encapsulating said plastic foam core member and said structural sheet members resulting in maximized structural and environmental integrity at a minimum of weight.

3. A modular floating environmental mooring system as set forth in claim 2
   wherein each of said endwalls and each of said sidewalls of each of said segments includes a planar structural sheet member coterminously overlying said plastic foam core member and joint means fixing said endwalls and said sidewalls to said upper and lower structural sheet members;
   wherein said first connection means includes:
   first spaced, generally parallel, connection plates fixed to said sidewall of one of said adjacent segments;
   a plurality of first apertured pin plates projecting away from said first connection plates;
   second spaced, generally parallel, connection plates fixed to said sidewall of the other of said adjacent segments;
   a plurality of second apertured pin plates projecting away from said second connection plates;
   fastener means extending through said first and second pin plates, respectively, for joining said adjacent pairs of said segments; and
   an elastomeric outer coating encapsulating said plastic foam core member, said structural sheet members, and said upper and lower connection plates resulting in maximized structural and environmental integrity at a minimum of weight.

4. A modular floating environmental mooring system as set forth in claim 3
   wherein each of said finger dock members includes, at said proximal end, a structural sheet member coterminously overlying said plastic foam core member and bonded thereto, said proximal structural sheet member lying in a plane transverse to that of said upper and lower structural sheet members; and
   wherein said second connection means includes:
   a pair of first spaced, generally parallel,
   connection plates fixed to said proximal end of said finger dock member;
   a first apertured pin plate projecting away from each of said first connection plates;
   a pair of second spaced, generally parallel, connection plates fixed to said outer surface of said associated segment;
   a second apertured pin plate projecting away from each of said second connection plates; and
   fastener means extending through said first and second pin plates, respectively, for joining said finger dock member to its associated one of said segments.

5. A modular floating docking system as set forth in claim 2
   wherein said elastomeric outer coating is a one hundred percent solids elastomeric urethane.

6. A modular floating docking system as set forth in claim 5
   wherein said elastomeric outer coating has the following properties:
   hardness, Shore D in the range of 50 to 70; tensile strength in the range of 2500 psi to 4000 psi; elongation in the range of 250% to 350%; tear die C in the range of 350 pli to 600 pli; and permeance in the range of 2.0 to 3,0 perms.

7. A modular floating environmental mooring system as set forth in claim 1 including:
  anchoring means for restraining said central dock member and said finger dock members against substantial movement on the surface of the body of water, said anchoring means including:
  a structural sheet member at said distal end of said finger dock member overlying said plastic foam core member and bonded thereto, said distal structural sheet member lying in a plane transverse to that of said upper and lower structural sheet members;
  a chain plate fixed to said distal structural sheet member; and
  a pad eye integral with said chain plate and projecting outwardly therefrom for reception therethrough of an end shackle for an anchor chain extending to an anchor.

8. An elongated component of high aspect ratio for a modular floating docking system comprising:
  an elongated plastic foam core member of substantially uniform thickness with substantially flat upper and lower surfaces;
  an upper planar structural sheet member coterminously overlying said plastic foam core member and bonded thereto; and
  a lower planar structural sheet member coterminously underlying said plastic foam core member and bonded thereto; and
  absent any structural sheet member contiguous to said plastic foam core and lying in planes transverse of said upper and lower planar sheet members, an elastomeric outer coating totally encapsulating, with no discontinuities, said plastic foam core member and said structural sheet members resulting in maximized structural and environmental integrity at a minimum weight.

9. A method of fabricating an elongated component of high aspect ratio for a modular floating docking system comprising the steps of:
  forming an elongate plastic foam core member having substantially uniform thickness and substantially flat upper and lower surfaces, substantially flat sidewalls lying in spaced apart planes generally perpendicular to the upper and lower surfaces, and substantially flat endwalls lying in spaced apart planes generally perpendicular to the upper and lower surfaces;
  bonding to the upper surface a planar structural sheet member coterminous with the upper surface;
  bonding to the lower surface a planar structural sheet member coterminous with the lower surface; and
  while leaving the flat sidewalls free of contiguous structural sheet members, applying to the entire outer surface of said plastic foam core member and said planar structural sheet members an elastomeric outer coating of substantially uniform thickness totally encapsulating, with no discontinuities, said plastic foam core member and said structural sheet members whereby maximized structural and environmental integrity is achieved at a minimum of weight.

10. A method as set forth in claim 9 wherein the elastomeric outer coating has a thickness in the range of approximately 0.10 inch to 0.20 inch.

11. A method as set forth in claim 9 wherein the step of applying an elastomeric outer coating is performed by spraying onto the entire outer surface of the plastic foam core member and the planar structural sheet members a liquid polymeric material which solidifies substantially upon contact by the receiving surface.

12. A method as set forth in claim 9 including the steps of:
  prior to the step of applying the elastomeric coating, bonding to one of the endwalls a planar structural sheet member coterminous with the endwall; and
  the step of applying the elastomeric after coating, fixedly attaching to the endwall at least one connection plate including a plurality of apertured pin plates projecting away therefrom for attachment to another component of the modular floating environmental mooring system.

13. A method as set forth in claim 9 wherein the elastomeric outer coating is a one hundred percent solids elastomeric urethane.

14. A method as set forth in claim 13 wherein the elastomeric outer coating has the following physical properties:
  hardness, Shore D in the range of approximately 50 to 70; tensile strength in the range of approximately 2500 psi to 4000 psi; elongation in the range of approximately 250% to 350%; tear die C in the range of approximately 350 pli to 600 pli; and permeance in the range of approximately 2.0 to 3.0 perms.

15. A modular environmental mooring system for flotation on a body of water comprising:
  a central dock member of generally annular configuration including a plurality of segments, each having at least one planar outwardly facing endwall and a pair of planar sidewalls lying in spaced apart angularly disposed planes, said segments being arranged in a contiguous side-by-side relationship;
  first connection means joining each adjacent pair of said segments at said mutually facing sidewalls;
  a plurality of elongated finger dock members, each having proximal and distal ends and extending radially outwardly from said proximal end disposed at said end wall of an associated one of said segments to said distal end, each of said finger dock members including:
  an elongated plastic foam core member of substantially uniform thickness with substantially flat upper and lower surfaces;
  an upper planar structural sheet member coterminously overlying said plastic foam core member and bonded thereto;
  a lower planar structural sheet member coterminously underlying said plastic foam core member and bonded thereto; and
  an elastomeric outer coating totally encapsulating, with no discontinuities, said plastic foam core member and said structural sheet members resulting in maximized structural and environmental integrity at a minimum of weight; and
  said modular environmental mooring system further comprising second connection means joining said proximal end of each of said finger dock members to said endwall of its associated one of said segments.

16. A modular floating docking system as set forth in claim 15 wherein said elastomeric outer coating is a one hundred percent solids elastomeric urethane.

17. A modular floating docking system as set forth in claim 16
wherein said elastomeric outer coating has the following properties:
hardness, Shore D in the range of 50 to 70; tensile strength in the range of 2500 psi to 4000 psi; elongation in the range of 250% to 350%; tear die C in the range of 350 pli to 600 pli; and permeance in the range of 2.0 to 3,0 perms.

18. A modular environmental mooring system for flotation on a body of water comprising:
a central dock member of generally annular configuration including a plurality of segments, each having at least one planar outwardly facing endwall and a pair of planar sidewalls lying in spaced apart angularly disposed planes, said segments being arranged in a contiguous side-by-side relationship;
first connection means joining each adjacent pair of said segments at said mutually facing sidewalls;
a plurality of elongated finger dock members, each having proximal and distal ends and extending radially outwardly from said proximal end disposed at said end wall of an associated one of said segments to said distal end;
second connection means joining said proximal end of each of said finger dock members to said endwall of its associated one of said segments; and
anchoring means for restraining said central dock member and said finger dock members against substantial movement on the surface of the body of water, said anchoring means including:
a plurality of anchors engageable with the bottom of the body of water;
elongate restraining means attached at one end to said anchor means and extending to an associated one of said finger dock members; and
connection means for releasably joining said second end of said elongate restraining means to the associated one of said finger dock members.

19. A modular floating environmental mooring system as set forth in claim 18
wherein said elongate restraining means is chain.

* * * * *